United States Patent
Genschorek

(10) Patent No.: US 7,634,875 B2
(45) Date of Patent: Dec. 22, 2009

(54) MOUNTING SYSTEM WITH THREADED SLIDING BLOCK

(75) Inventor: Gido Genschorek, Rangsdorf (DE)

(73) Assignee: Conergy AG, Rangsdorf (DE)

( * ) Notice: Subject to any disclaimer, the term of this patent is extended or adjusted under 35 U.S.C. 154(b) by 498 days.

(21) Appl. No.: 11/328,062

(22) Filed: Jan. 10, 2006

(65) Prior Publication Data

US 2006/0156651 A1     Jul. 20, 2006

(30) Foreign Application Priority Data

Jan. 10, 2005  (DE) ........................ 10 2005 001 653
Jan. 10, 2005  (DE) ........................ 10 2005 001 654

(51) Int. Cl.
*E04D 13/18*  (2006.01)
*E04C 3/00*   (2006.01)

(52) U.S. Cl. ........................... 52/173.3; 52/843; 52/846; 403/331

(58) Field of Classification Search ................. 52/173.3, 52/843, 846, 167.4; 248/226.11, 228.6, 231.71; 211/94.01; 403/331, 381, 252, 256, 258; 292/137; 126/569, 704

See application file for complete search history.

(56) References Cited

U.S. PATENT DOCUMENTS

| | | | |
|---|---|---|---|
| 3,333,799 A * | 8/1967 | Peterson ..................... 248/674 |
| 4,100,709 A * | 7/1978 | Good ......................... 52/239 |
| 4,729,138 A * | 3/1988 | Heyman et al. ................ 5/658 |
| 5,121,583 A * | 6/1992 | Hirai et al. .................... 52/90.1 |
| 5,164,020 A * | 11/1992 | Wagner et al. ............... 136/251 |
| 5,464,302 A * | 11/1995 | Menchetti ................... 403/335 |
| 5,571,338 A * | 11/1996 | Kadonome et al. ........... 136/251 |
| 5,740,996 A | 4/1998 | Genschorek |
| 6,302,238 B1 * | 10/2001 | Preusser et al. ............. 182/150 |
| 6,370,828 B1 * | 4/2002 | Genschorek .................. 52/200 |
| 6,712,540 B2 * | 3/2004 | Schmalzhofer et al. ..... 403/248 |
| 6,784,360 B2 * | 8/2004 | Nakajima et al. ........... 136/251 |
| 6,959,517 B2 * | 11/2005 | Poddany et al. ............. 52/173.3 |
| 2004/0163338 A1 * | 8/2004 | Liebendorfer .............. 52/173.1 |

(Continued)

FOREIGN PATENT DOCUMENTS

DE          3423 227 A1      6/1984

(Continued)

*Primary Examiner*—Brian E Glessner
*Assistant Examiner*—Jason Holloway
(74) *Attorney, Agent, or Firm*—Patent Central LLC; Stephan A. Pendorf

(57) ABSTRACT

The invention relates to a mounting system consisting of aluminum profiles (1, 11) in which threaded sliding blocks (14) inserted in the profiles are used, in particular, for fastening to solar modules and roof supports.

The mounting system comprises at least two spaced apart profiled mounting rails (1) respectively with a support (2) limiting the profile height (7) and a connection (3) below the support (2) for the roof mounting. Threaded sliding blocks (14) are inserted in a form-fitting manner in each profiled mounting rail (1) for fastening the connection with the solar modules and the roof mounts.

The profiled mounting rail has additional connecting profiles (4, 5, 6), arranged on the side or on the side and bottom, for engagement with complementary connecting profiles (8, 9, 10) of a profiled connecting rail (11). The profiled mounting rail (1) can be extended by sliding shaped pieces (13) with the profile of the profiled mounting rail (1) onto the profiled connecting rail (11).

17 Claims, 4 Drawing Sheets

U.S. PATENT DOCUMENTS

2004/0221524 A1* 11/2004 Poddany et al. ............ 52/204.5
2007/0256996 A1* 11/2007 Jackle .................... 211/94.01

FOREIGN PATENT DOCUMENTS

| | | |
|---|---|---|
| DE | 8801554 U1 | 4/1988 |
| DE | 91 09 605.7 | 8/1991 |
| DE | 197 17 996 A1 | 4/1997 |
| DE | 19727302 C1 | 8/1998 |
| DE | 299 11 401 U1 | 6/1999 |
| DE | 299 19 147 U1 | 10/1999 |
| DE | 101 32 557 A1 | 7/2001 |
| DE | 10113667 A1 | 9/2002 |
| EP | 0 761 901 B1 | 8/1996 |
| EP | 0905795 A | 3/1999 |
| JP | 10266472 A | 1/1999 |
| WO | WO 2004/079775 A | 9/2004 |

* cited by examiner

MOUNTING SYSTEM WITH THREADED SLIDING BLOCK

FIELD OF INVENTION

The invention relates to a mounting system consisting of aluminum profiles which is particularly suitable for fastening solar modules. Threaded sliding blocks inserted into the profiles are used, in particular, for the fastening to solar modules and roof supports.

BACKGROUND OF THE INVENTION

For the most part, manufacturers or suppliers of solar modules produce support systems which are specially adapted to the modules, are relatively expensive and which must be adapted to the specific application. Conventional support systems require a high assembly cost, the result of which is that the support systems and the mounting of the modules substantially increase the total cost of systems of this type.

Therefore, there is a great need to provide a mounting system or a mounting profile which can be used together with different modules, which reduces assembly cost, and enables a fastening of the modules that meets safety regulations and ensures a precise, damage-avoiding fastening of the modules over a long period of time. Moreover, there is the need for a mounting profile which is suitable for mounting systems for fastening modules at various locations of use, in particular, for fastening them to roofs, facades and free-standing installations.

To solve these problems, DE 101 32 557 A1 proposes a mounting profile for fastening photovoltaic modules comprising: an elongated, parallelepiped base; a toothed surface portion on at least one lateral face of the base; a lateral screw channel which extends essentially parallel to the longitudinal axis on at least one lateral face of the base; and at least one drainage channel which extends in longitudinal direction in the base open to the upper side and an upper screw channel which extends essentially parallel to the longitudinal axis on the upper side of the base between two weather strips. Accurately prepared mounting profiles or their adaptation on site are required for this solution. These requirements are not optimal, since assembly takes place under more difficult conditions on the roof or on scaffolding on the facade.

DE 34 23 227 A1 describes a holding device for solar collectors which has several mounting supports which are formed from a mounting profile and a supporting plate. Furthermore, at least two supporting rails form part of the holding device which can be moved along the mounting profiles of the mounting support and secured and which can, in turn, receive fastening elements which are adjustable in their longitudinal direction and can be secured for the direct or indirect engagement on the solar collector. Above all, when anchor rails are used which extend transverse to the supporting rails, it should be possible to produce stable frames which can be adjusted in any direction and to which solar collectors can be anchored. The disadvantage of this system is the plurality of rails to be screwed together, the lack of adjustability vis-à-vis the roof surface, and the selected manner of fastening.

The kit described in DE 91 09 605 U1 consists of at least four hooks which can be suspended in roof laths and tiles, and which are telescopically extendable, a vertical rail allocated to each pair of hooks so as to be movable and at least two horizontal rails which each connect the adjacent vertical rails are movable relative thereto, wherein the solar modules are horizontally movable, insertable and lockable within the horizontal rails. The kit offers a certain flexibility in the roof plane, is however cumbersome to handle because of its height due to the lattice-like rail arrangement and due to the number of screw connections.

The collector quick mounting system according to DE 197 17 996 A1 provides roof hooks with a tubular socket as mechanical connecting element between roof construction and solar collector. The roof hooks are pushed under the roof tiles and hooked into a roof lath and otherwise lie on the roof tile. The collectors are fastened by means of retaining clips on the tubular sockets arranged horizontally after assembly, whereby the retaining clips can be screwed onto the back of the collectors after first measuring the distance of the tubular sockets. The disadvantage of this mounting system is, in particular, the required accurate attachment of the retaining clips and the inability to correct.

A device for fastening plate-like components, in particular solar modules and solar collectors, is known from EP 0 761 901 B1, in which the plate-like components are arranged on them in longitudinal direction, superposed in a scale-like manner, and the component on the top in direction of the higher side overlaps with its front end the rear end of the component below it. The plate-like components on the profiles are fastened in longitudinal direction to essentially horizontal frame parts such as roof laths and suspended with their lower end in hooks. Each profile has two lateral bearing surfaces on its upper side extending in longitudinal direction thereof and a recess between said bearing surfaces and the components lie with their lateral edges on one of the bearing surfaces of the profile. A gap is arranged therebetween above the recess. The profile is thereby designed in such a way that the lower section of a second profile can be pushed into the upper section of the profile so that both sections adjoin one another in a form-fitting manner.

The profiles can be pushed into one another to any length desired, as a result of which differences in length can be adjusted.

This object, which remained ignored in spite of numerous efforts to create assembly-friendly and adaptable building systems, is now to be dealt with by the present invention.

Since extruded aluminum profiles are usually used as support profiles, screw connections are used inter-connection employing prefabricated bores or blocks sliding in the support profiles.

A connection of this type is described, inter alia, in DE 34 23 227 A1 and DE 299 19 147 U1. The sliding blocks on the longitudinal side are thereby laterally pushed into the groove or must be turned by 90° after insertion into the groove in order to be secured behind the inwardly bent groove sides.

In addition to the use of screw connections of this type where the block has parallel flat surfaces at the support and the opposite surface, blocks are also known which are domed or round (DE 299 11 401 U1).

A sliding block, which has a semicircular shape on one side, and which can be tilted into a support profile groove by the rounding is offered by the firm SCHÜCO International KG, Bielefeld, Germany. This sliding block is secured after insertion by means of a springloaded ball situated in the block.

Depending on the design, the disadvantages of these connections are, inter alia, essentially the required lateral insertion of the sliding block, the subsequent establishment of the connection block/clamp bolt, required rotation of the block to bring it into a securable position, the securing by additional elements prior to screwing together, just to name the most important disadvantages.

SUMMARY OF THE INVENTION

It is therefore desirable to use profiled supporting rails with standard lengths in a cost-efficient manner to assemble solar modules of various dimensions and to thereby use threaded sliding blocks in the supporting rails to establish the connections to the solar modules and/or roof mountings.

According to one aspect, the invention provides a mounting system for fastening solar modules comprising at least two spaced apart profiled mounting rails each with a support for the module or modules defining the profile height, as well as a connection for the roof mounting located below the support. To fasten together the solar modules and the roof mounting, threaded sliding blocks are used which engage in a form-fitting manner in each of the profiled mounting rails. The profiled mounting rail is provided with connecting profiles on the side or on the side and bottom which can be connected to complementary connecting profiles of a profiled connecting rail, to achieve a form-fitting connection at least at two points between the profiles after they have been joined and a force-fit connection can be established, whereby the profiled connecting rail is preferably flush at the top with the profile height of the profiled mounting rail after the form-fitting connection has been produced. The mechanical load bearing capacity of the profiled connecting rail is approximately that or equal to that of the profiled mounting rail and at least one portion of the profiled mounting rail can be connected and secured by way of its connecting profiles to the connecting profiles of the connecting rail.

In one aspect the present invention provides a mounting system for fastening solar modules to a mounting surface, comprising: (a) at least two spaced apart, profiled mounting rails, each mounting rail having: a support defining the height of the mounting rail profile; a connector below the support for mounting the rail to the mounting surface; threaded sliding blocks, engaging the profiled mounting rail in a form-fitting manner, wherein at least one threaded sliding block is for fastening the mounting rails to the solar modules and at least one threaded sliding block is for fastening the mounting rails to the mounting surface; and mounting rail connecting profiles arranged laterally or both laterally and at the bottom of the profiled mounting rail, (b) at least two profiled connecting rails, each connecting rail having: connecting rail connecting profiles for engaging the mounting rail connecting profiles to generate a form-fitting connection at least at two points between the profiled mounting rail and the profiled connecting rail after engagement of the respective connecting profiles and to establish a force-fitting connection; wherein the mechanical load capacity of the profiled connecting rail is approximately that or the same as that of the profiled mounting rail.

In one aspect, the present invention provides a mounting system for fastening solar modules, comprising: defining at least two spaced apart profiled mounting rails with a support limiting the profile height and a connector below the support for roof mounting, threaded sliding blocks engaging the mounting rail in a form-fitting manner, at least one block for fastening for the solar modules and one block for the mounting rail having connecting roof mounting profiles, arranged laterally or laterally and at the bottom, for engaging complementary connecting profiles of a profiled connecting rail, to generate a form-fitting connection at least at two points between the connecting profiles of the respective rails after they are joined together and a force-fit connection wherein the mechanical load capacity of the profiled connecting rail is approximately that or the same as that of the profiled mounting rail and wherein at least one section of the profiled mounting rail is connectable by its connecting, profiles to the connecting profiles of the profiled connecting rail.

In a preferred embodiment, the connecting profiles of the profiled mounting rail and the connecting profiles of the profiled connecting rail fit together to form a telescopic profile pair.

To illustrate, it is noted that the particulars of the profiled rails are always given relative to their cross-sectional shape, (U-section, angle, peg) and that this cross-sectional shape is the same way along the rails.

The specified basic construction makes it possible to use profiled mounting rails of standard lengths, e.g. 2.95 m or 6 m, and to replace the missing piece at the end by a profiled connecting rail. Since the connection of the two rails is adjustable, an exact dimensioning of the supporting framework is ensured. Portions of the profiled mounting rails, which can now be designated as shaped parts, can then be mounted or slid onto the profiled connecting rails, so that one can also continue with the same system for the fastening of the solar modules or the roof mounting. The important point in this context is the mentioned approximated or equal load capacity of the profiled connecting rails and the profiled mounting rails.

To fasten structural components to the profiled mounting rails or the shaped piece by means of a screw connection, threaded sliding blocks are provided which are each brought into a force-fit engagement with the profiled mounting rail or shaped piece, by arranging them between two flanges of the profiled mounting rail or shaped piece essentially parallel to the tapped bore of the threaded sliding block and at a distance from one another and that one flange has a terminal bend which projects around the threaded sliding block, so that the arranged threaded sliding block is also limited in its movement laterally from above, the threaded sliding block being supported at the bottom on at least two further flanges of the profiled mounting rail or shaped piece, one flange of which engages in a form-fitting manner into the threaded sliding block and in this way also limits a movement away from the flange.

In an advantageous embodiment, one flange of said supporting flanges extends essentially parallel to the laterally limiting flanges and in longitudinal direction of the profiled mounting rail or shaped piece, while the other flange is designed as a bearing surface for the threaded sliding block at a right angle to one of the laterally limiting flanges.

Preferably, the threaded sliding block has an L-shaped cross-section, the tapped bore penetrating the long leg of the L-section and the shorter leg having a recess on the inside for establishing the connection with a supporting flange, in particular, in a form-fitting manner, with the bend thereof.

It has proven successful to reinforce the long leg of the L-section in the area of the tapped bore, so that the thread is prevented from being torn out under load.

Moreover, an advantageous embodiment provides that one of the supporting flanges has a profiled projection on the side pointing to the axis of the tapped bore, said profiled projection engaging the thread of the bolt, which is rotated in the tapped bore, and being slightly deformed when the bolt is screwed in. This serves to quickly secure the threaded sliding block.

In order to not only realize fastening functions for the solar module but also for the roof or facade mounting, a further advantageous embodiment provides that the first profile of supporting and limiting flanges is provided a second time but in an orientation rotated from the one of the first profile, preferably by 90°, for receiving one or additional threaded sliding blocks. In this case, the roof or facade mounting elements can then be fastened using this second profile.

BRIEF DESCRIPTION OF THE DRAWINGS

The invention will be further described by way of example only and with reference to one embodiment as shown.

DETAILED DESCRIPTION OF THE DRAWINGS

Figure 1:
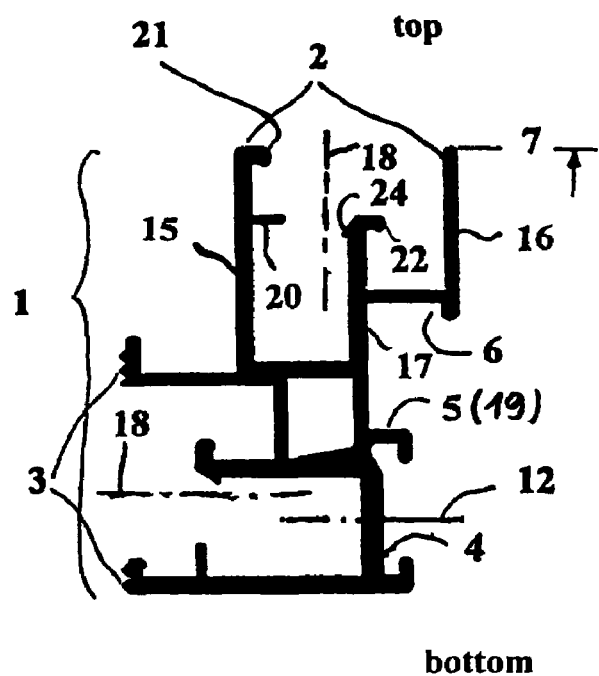
FIG. 1: a profiled mounting rail.

FIG. 1 shows a profiled mounting rail 1 with a support 2 defining the profile height 7, a connection 3 below the support 2 for roof mounting, and laterally arranged first connecting profiles 4, 5, 6 for complementary second connecting profiles 8, 9, 10 of a profiled connecting rail 11, whereby a form-fit exists at least at two locations between the first and second connecting profiles after they have been joined and a force-fitting connection can be made. The first and second connecting profiles fit together telescopically in the embodiment shown.

Figure 2:
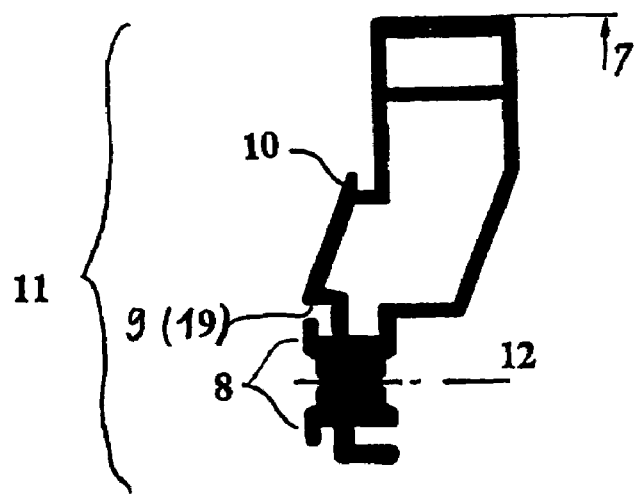
FIG. 2: a profiled connecting rail.

The profiled connecting rail 11 is shown in FIG. 2. The telescopic first connecting profile pairs 4, 8 thereby consist of a U-section respectively, having legs with a terminal inward and outward bend, preferably a 90° bend, to form complementary profiles.

The first connecting profile 6 of the profiled mounting rail 1 and the second connecting profile 10 of the connecting rail 11, which also form a telescopic profile pair, consist of an angle (profile 6) on the one hand and the complementary other profile of a peg profile (profile 10).

In addition, the third connecting profile 5 of the profiled mounting rail 1 and the third connecting profile 9 of the profiled connecting rail 11 each form outwardly planar bearing surfaces 19 which rest against one another after assembly.

The force-fit connection 12 between the profiled mounting rail 1 and the profiled connecting rail 11 is formed by a bolt which is guided through the profiled connecting rail 11 in the region of the second connecting profile 8 and pressed against the profiled mounting rail 1. For this purpose, a thread is cut into the profiled connecting rail 11. To achieve the required physical properties, the profiled connecting rail 1 is solid in this region, whereas it is in the form of a box or hollow section elsewhere. The mechanical load capacity of the profiled connecting rail 11 is thereby similar to or the same as that of the profiled mounting rail 1.

Moreover, it is advantageous if, after establishment of the form-fitting connection, the profiled connecting rail 11 is flush with the profile height 7 of the profiled mounting rail 1 at the top. This enlarges the bearing surface.

Figure 3:
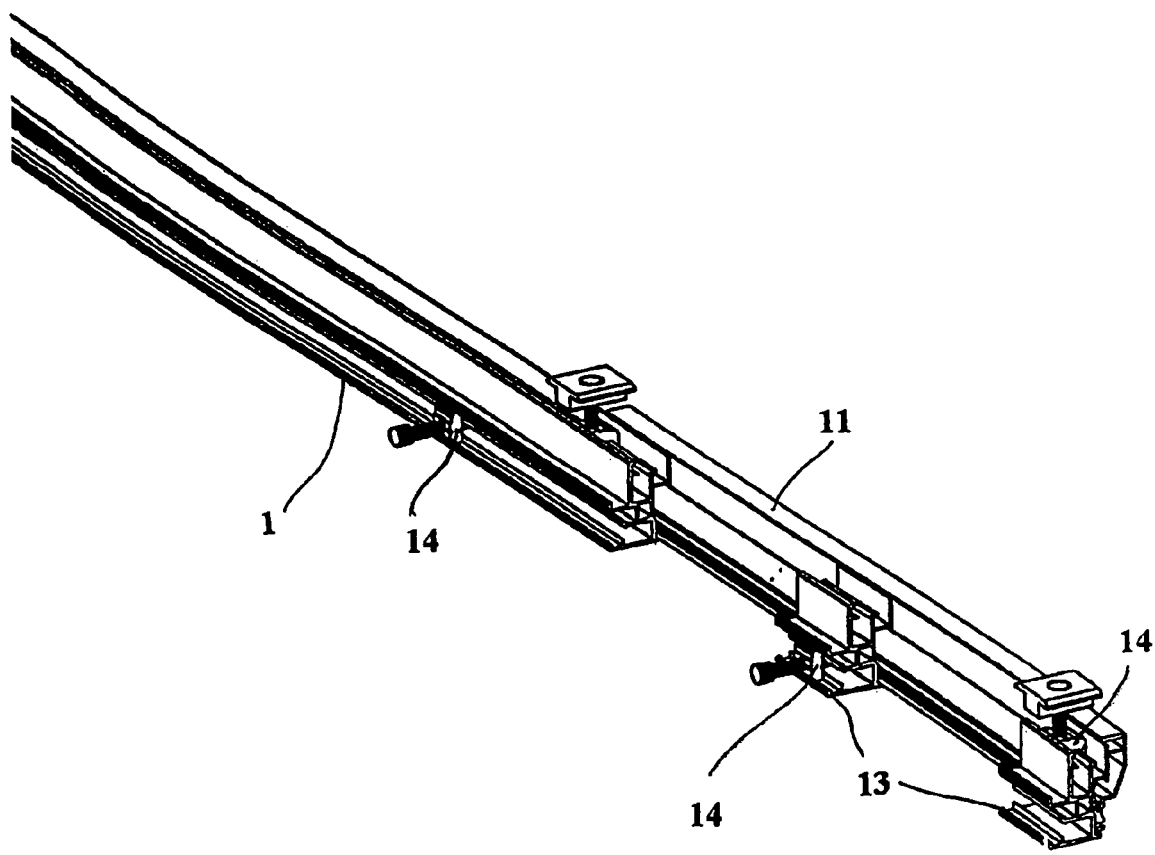
FIG. 3: a mounted view.

FIG. 3 shows the profiled mounting rail 1 extended with the profiled connecting rail 11 in a perspective view. Portions of the profiled mounting rail 1, profiled pieces 13 in this case, are pushed onto the profiled connecting rail 11 and fastened in a force-fitting manner. The mounting system with the profiled mounting rail 1 is continued in this way in the area of the profiled connecting rail 11 without difficulty and also guarantees the required physical properties at a most precise adaptation to the solar modules.

Figure 4:
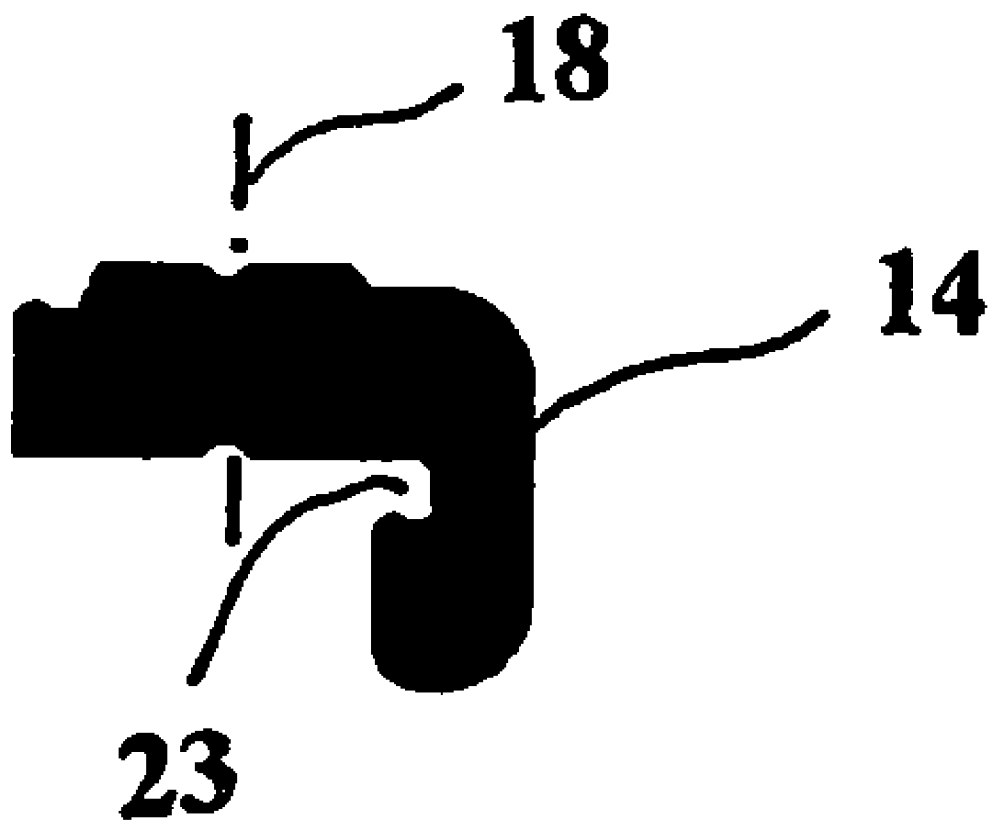
FIG. 4: a threaded sliding block.

FIG. 4 shows a threaded sliding block 14 which can be inserted in a form-fitting manner into the profiled mounting rail 1 or the shaped pieces 13. The threaded sliding block 14 is placed between a pair of retaining flanges 15, 16, of the profiled mounting rail 1 or the shaped pieces 13, with flanges are oriented essentially parallel and at a distance from one another, whereby the flange 15 has a bend 21 which projects around the inserted threaded sliding block 14, so that the arranged threaded sliding block 14 is also laterally limited in its movement from the top.

At the bottom, the inserted threaded sliding block 14 is supported on two supporting flanges 17, 20 of the profiled mounting rail 1, of which flange 17 engages in a form-fitting manner in the threaded sliding block 14 with its bend 22 and thus also limits a movement away from the flange 17. The flange 17 thereby extends parallel to the retaining flanges 15, 16 and between them.

The retaining flange 20 is a bearing surface for the inserted threaded sliding block 14 and arranged at a right angle to retaining flange 15 extending on it.

In addition, supporting flange 17 has a profiled projection 24 on the side pointing towards the axis of the tapped bore 18, said profiled projection 24 engaging the thread of the bolt which is screwed into the tapped bore 18 and slightly deformed when the bolt is screwed in. The movement of the threaded sliding block 14 is thus already limited after one turn of the bolt.

The threaded sliding block 14 has an L-shaped cross-section in the embodiment shown, having a long leg and a short leg.

The tapped bore 18 is situated in the long leg of the L-section and the short leg has a recess 23 on the inside for establishing the connection with the supporting flange 17, in particular in a form-fitting manner with its bend 22.

The long leg of the L-section is reinforced in the area of the tapped bore 18, so that a stripping of the thread under load is prevented.

For the assembly, a bolt is screwed into the threaded sliding block 14. The threaded sliding block 14 is then inserted obliquely from the top between the bend 21 of the retaining flange 15 and the supporting flange 20 and the short leg of the threaded sliding block 14 is then pushed between flanges 17 and 16. With a small deflection of retaining flange 15, the form-fitting connection or the position for a form-fitting connection between the bend 22 of the supporting flange 17 and the recess 23 on the short leg of the threaded sliding block 14 is established.

By screwing the bolt further into the tapped bore 18, the thread grips the profiled projection 24 and the threaded sliding block 14 is fixed for the later bracing. The illustration shows that it is also possible to accurately insert the threaded sliding block 14 into the support profile of the mounting rail 1 under on-site conditions without difficulty. Due to the fact that the bolt has already been screwed in, the threaded sliding block 14 is easy to handle, and the "threading in" of the bolt into the tapped bore 18 on site is obviated.

In addition, the threaded sliding block 14 is an easy to produce, extruded and then cut-to-length shaped piece with a pre-cut tapped bore 18.

Figure 5:
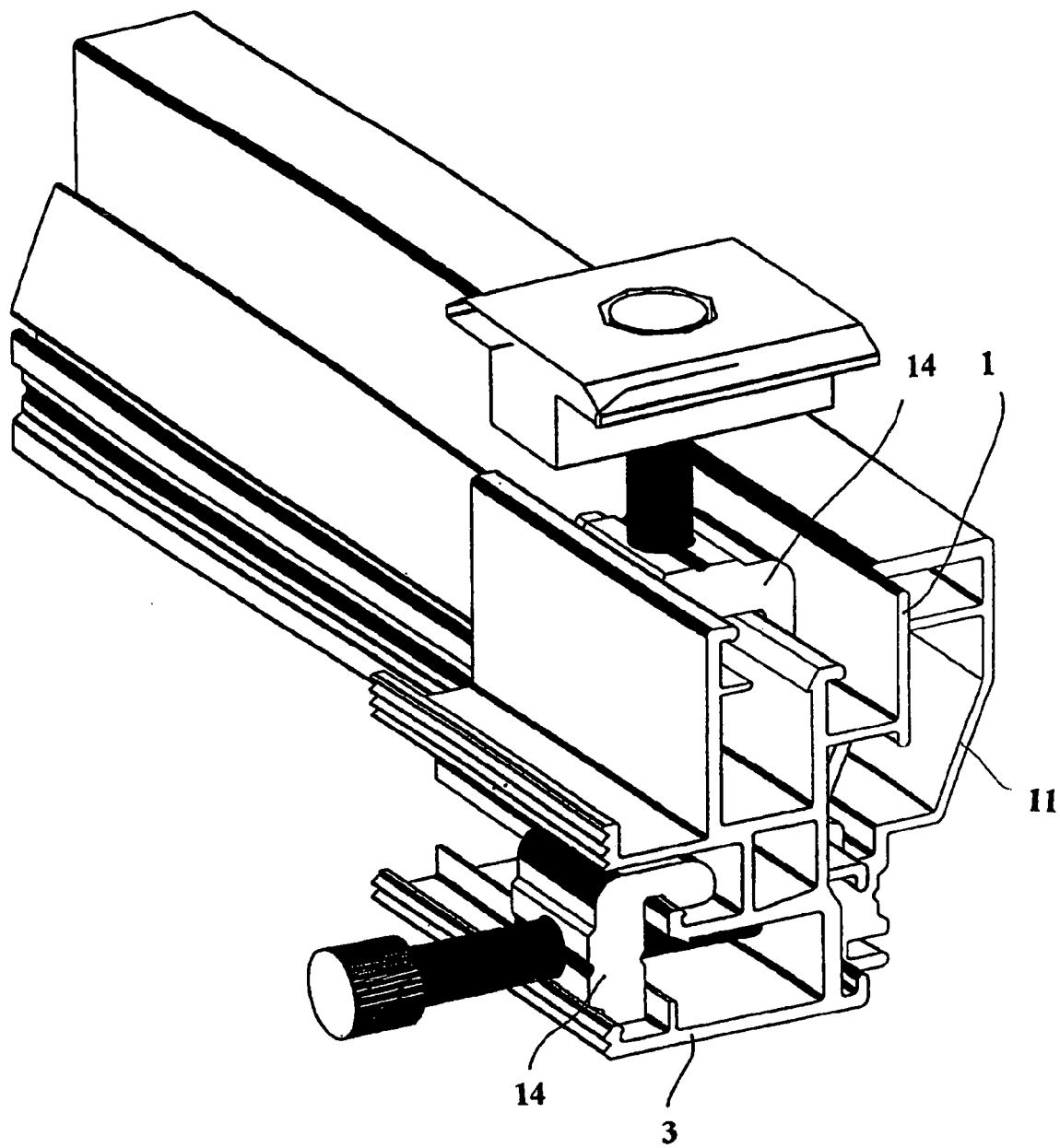
FIG. 5: the placement of the threaded sliding block in the profiled mounting rail.

As is apparent, a profile portion of the mounting rail 1 which includes the retaining and supporting flanges 15, 16, 17, 20 is provided twice in the overall profile of the mounting rail 1, whereby the profile portions are at an orientation rotated relative to one another, preferably rotated by 90°. This is shown in FIG. 5. In other words, the rail includes two identical support profiles which are oriented at an angle of 90° to one another to respectively allow for a connection to the solar modules at a connection for roof and facade mounting. Thus, FIG. 5 shows threaded sliding blocks 14 respectively inserted into a support profile of the mounting rail 1.

The invention claimed is:

1. A mounting system for fastening solar modules to a mounting surface, comprising:
   (a) at least two spaced apart, profiled mounting rails, each mounting rail having:
   a support defining the height of the mounting rail profile;
   a connector below the support for mounting the rail to the mounting surface;
   threaded sliding blocks, engaging the profiled mounting rail in a form-fitting manner, wherein at least one threaded sliding block is for fastening the mounting rails to the solar modules and at least one threaded sliding block is for fastening the mounting rails to the mounting surface; and
   mounting rail connecting profiles arranged laterally on the profiled mounting rail,
   (b) at least two profiled connecting rails, each connecting rail having:
   connecting rail connecting profiles for engaging the mounting rail connecting profiles to generate a form-fitting connection at least at two points between the profiled mounting rail and the profiled connecting rail after engagement of the respective connecting profiles and to establish a force-fitting connection; wherein the mechanical load capacity of the profiled connecting rail is approximately that or the same as that of the profiled mounting rail; and
   c) wherein a first connecting profile of the profiled mounting rails and a second connecting profile of the profiled connecting rails form a telescopic profile pair; and
   (d) wherein the first connecting profiles of the telescopic profile pair each consist of a U-shaped section, with legs having bent ends that are bent inward on one of the connecting profiles and outwardly on the other one of the telescopic profile pairs.

2. The mounting system according to claim 1, wherein the profiled connecting rail has an upper planar surface abutting with, and forming a coplanar surface with, the upper edges of the profiled mounting rail after the form-fitting connection has been made.

3. The mounting system of claim 1, wherein the legs have angles of bending of about 90°.

4. The mounting system according to claim 1, wherein a second connecting profile of the profiled mounting rail and a second connecting profile of the profiled connecting rail form a telescopic profile pair, wherein one of the second connecting profiles has a lip-shape and the other has a peg-shape.

5. The mounting system according to claim 1, wherein a third connecting profile of the profiled mounting rail and a third connecting profile of the profiled connecting rail each form flat bearing surfaces which are in contact after engagement of the rails and the establishment of a force-fit connection.

6. The mounting system according to claim 1, wherein the force-fit connection between the profiled mounting rail and the profiled connecting rail is formed by a threaded fastener guided through the profiled connecting rail in a region of a fourth connecting profile, for forcing again the profiled mounting rail.

7. The mounting system according to claim 6, wherein the profiled connecting rail is in the form of a box or hollow section, except for the region of the fourth connecting profile.

8. The mounting system according to claim 6, wherein the connecting rail further comprises a tapped bore for the fastener, to establish the force-fit connection.

9. The mounting system according to claim 1, wherein the profiled mounting rail further comprises retaining flanges, wherein each threaded sliding block is connected in a force-fitting manner to the profiled mounting rail between two approximately vertical retaining flanges, wherein said approximately vertical retaining flanges are arranged essentially spaced apart and parallel to a tapped bore in the threaded sliding block, wherein one of said approximately vertical flanges has a terminal lip which projects around the threaded sliding block, for laterally limiting upward movement of the arranged threaded sliding block, and wherein each threaded sliding block is further supported by at least two supporting flanges on the profiled mounting rail, one flange of which extends in a form-fitting manner into the threaded sliding block for preventing the threaded sliding block moving away from the flange.

10. The mounting system according to claim 9, wherein one of the two supporting flanges extends in between and essentially parallel to the approximately vertical flanges, in longitudinal direction of the profiled mounting rail, and wherein the other of the two supporting flanges is a bearing surface for the threaded sliding block extending at an approximately right angle to one of the two approximately vertical flanges.

11. The mounting system according to claim 9, wherein a profile portion of the mounting rail including the retaining and supporting flanges is provided twice in the mounting rail at two different orientations, rotated to one another, for respectively accepting a separate threaded sliding block.

12. The mounting system of claim 11, wherein the profile portion of the mounting rail including the retaining and supporting flanges is provided twice in the mounting rail, rotated at 90° to one another.

13. The mounting system according to claim 9 wherein the threaded sliding block has an L-shaped cross-section with a long leg and a short leg.

14. The mounting system according to claim 13, wherein the tapped bore penetrates the long leg and the shorter leg has a recess for establishing the connection with one of the two additional flanges.

15. The mounting system according to claim 13, wherein the long leg of the L-section is reinforced in the area of the tapped bore, for preventing stripping of the thread under load.

16. The mounting system according to claim 9, wherein one of the two additional flanges has a profiled projection on the side pointing to the axis of the tapped bore, for engaging the thread of a bolt received in the tapped bore, the projection being deformable by the bold.

17. The mounting system according to claim 1, wherein the mounting rail is 2.95 m or 6 m.

* * * * *